(12) United States Patent
Hyun et al.

(10) Patent No.: US 8,837,130 B2
(45) Date of Patent: Sep. 16, 2014

(54) DISPLAY DEVICE

(75) Inventors: Jaemin Hyun, Seoul (KR); Duckho Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 162 days.

(21) Appl. No.: 13/639,462

(22) PCT Filed: Oct. 28, 2010

(86) PCT No.: PCT/KR2010/007449
§ 371 (c)(1),
(2), (4) Date: Oct. 4, 2012

(87) PCT Pub. No.: WO2011/126191
PCT Pub. Date: Oct. 13, 2011

(65) Prior Publication Data
US 2013/0027859 A1     Jan. 31, 2013

(30) Foreign Application Priority Data

Apr. 5, 2010 (KR) ........................ 10-2010-0030870

(51) Int. Cl.
| | |
|---|---|
| *G06F 1/16* | (2006.01) |
| *E05F 1/08* | (2006.01) |
| *G02F 1/1333* | (2006.01) |
| *F16M 11/04* | (2006.01) |
| *F16M 13/00* | (2006.01) |
| *F16M 11/10* | (2006.01) |

(52) U.S. Cl.
CPC ........... *F16M 13/00* (2013.01); *F16M 2200/08* (2013.01); *G02F 1/1333* (2013.01); *F16M 11/04* (2013.01); *F16M 2200/041* (2013.01); *F16M 11/10* (2013.01); *Y10S 248/917* (2013.01); *Y10S 248/918* (2013.01); *Y10S 248/919* (2013.01); *Y10S 248/922* (2013.01); *Y10S 248/923* (2013.01)

USPC ............ 361/679.05; 361/679.21; 361/679.22; 248/917; 248/918; 248/919; 248/922; 248/923; 16/308

(58) Field of Classification Search
USPC ............. 361/679.01–679.45, 679.55–679.59; 248/917–924; 16/221–392; 455/575.1, 455/575.3, 575.4; 345/156, 157, 168, 169, 345/905; 312/223.1, 223.2
See application file for complete search history.

(56) References Cited

U.S. PATENT DOCUMENTS

| | | | | |
|---|---|---|---|---|
| 6,532,628 B2* | 3/2003 | Kim | ................................ | 16/342 |
| 6,568,034 B2* | 5/2003 | Cho | ................................ | 16/337 |

(Continued)

FOREIGN PATENT DOCUMENTS

| | | |
|---|---|---|
| KR | 10-2005-0083378 A | 8/2005 |
| KR | 10-2007-0078134 A | 7/2007 |

(Continued)

*Primary Examiner* — Nidhi Desai
(74) *Attorney, Agent, or Firm* — Birch, Stewart, Kolasch & Birch, LLP

(57) ABSTRACT

The present invention relates to a display device. According to the present invention, the display device comprises: a display body from which an image is outputted; and a flip hinge assembly which is coupled with the display body, wherein the flip hinge assembly comprises: a fixing unit that is fixed to the display body; a rotation unit that is coupled with the fixing unit to allow rotation thereon; a first elastic member that is coupled with the rotation unit and the fixing unit; and a second elastic member that has one end coupled with the fixing unit, and has the other end selectively contacted with the rotation unit, wherein said second elastic member provides, to the rotation unit, an elastic force which is opposite to an elastic force provided to the rotation unit by the first elastic member. Thus, according to the present invention, an initial tilting angle of the display body is automatically set, thereby increasing user convenience.

20 Claims, 8 Drawing Sheets

(56) References Cited

U.S. PATENT DOCUMENTS

| | | | |
|---|---|---|---|
| 7,421,762 B2* | 9/2008 | Lu et al. | 16/328 |
| 7,478,789 B2* | 1/2009 | Yukawa et al. | 248/371 |
| 7,614,594 B2* | 11/2009 | Baek et al. | 248/274.1 |
| 7,637,463 B2* | 12/2009 | Yen et al. | 248/157 |
| 7,717,384 B2* | 5/2010 | Kim | 248/284.1 |
| 7,726,616 B2* | 6/2010 | Zhang et al. | 248/284.1 |
| 8,226,054 B2* | 7/2012 | Chen et al. | 248/127 |
| 2009/0031531 A1* | 2/2009 | Chang et al. | 16/333 |

FOREIGN PATENT DOCUMENTS

| | | |
|---|---|---|
| KR | 10-2008-0015606 A | 2/2008 |
| KR | 10-2008-0015607 A | 2/2008 |
| WO | WO 2007/086627 A1 | 8/2007 |

\* cited by examiner

US 8,837,130 B2

DISPLAY DEVICE

TECHNICAL FIELD

The present disclosure relates to a display device.

BACKGROUND ART

Display devices display an image. Typical display devices used in desktop computers can be tilted at the level of a user's eyes. Along with miniaturization of display devices and development of touch screens, picture frame type display devices, which employ a flip hinge stand, are drawing attention.

Such flip hinge stands are manually tilted by a user, to adjust an image angle.

DISCLOSURE OF THE INVENTION

Technical Problem

Embodiments provide a display device that makes it possible to set an initial tilting angle of a flip hinge stand without adjusting a tilting angle.

Embodiments also provide a display device that makes it possible for a user to adjust force needed for tilting a flip hinge stand.

Technical Solution

In one embodiment, a display device includes: a display main body from which an image is output; and a flip hinge assembly coupled to the display main body, wherein the flip hinge assembly includes: a stationary part fixed to the display main body; a rotary part rotatably coupled to the stationary part; a first elastic member coupled to the rotary part and the stationary part; and a second elastic member, an end of which is coupled to the stationary part, and the other end thereof selectively contacts the rotary part, wherein the second elastic member applies elastic force to the rotary part in a direction opposite to a direction of elastic force the first elastic member applies to the rotary part.

In another embodiment, a display device includes: a display main body from which an image is output; a hinge shaft coupled to a rear surface of the display main body; a flip hinge body coupled to the hinge shaft and rotating integrally with the hinge shaft; a first elastic member, an end of which is coupled to the display main body, and the other end thereof is coupled to the hinge shaft to pull the hinge shaft in a direction; a second elastic member having an end coupled to the display main body, wherein when an angle formed between the flip hinge body and the display main body is within a preset angle range, the other end of the second elastic member applies elastic force to the hinge shaft or the flip hinge body to rotate the hinge shaft in another direction.

Advantageous Effects

According to the embodiments, an initial tilting angle of a display main body is automatically set, thereby improving user convenience.

In addition, force needed for tilting a display main body can be adjusted through simple manipulation.

MODE FOR CARRYING OUT THE INVENTION

Hereinafter, exemplary embodiments will be described in detail with reference to the accompanying drawings. The spirit and scope of the present disclosure, however, shall not be construed as being limited to embodiments provided herein. Rather, it will be apparent that other embodiments that fall within the spirit and scope of the present disclosure may easily be derived through adding, modifying, and deleting elements herein.

Figure 1:
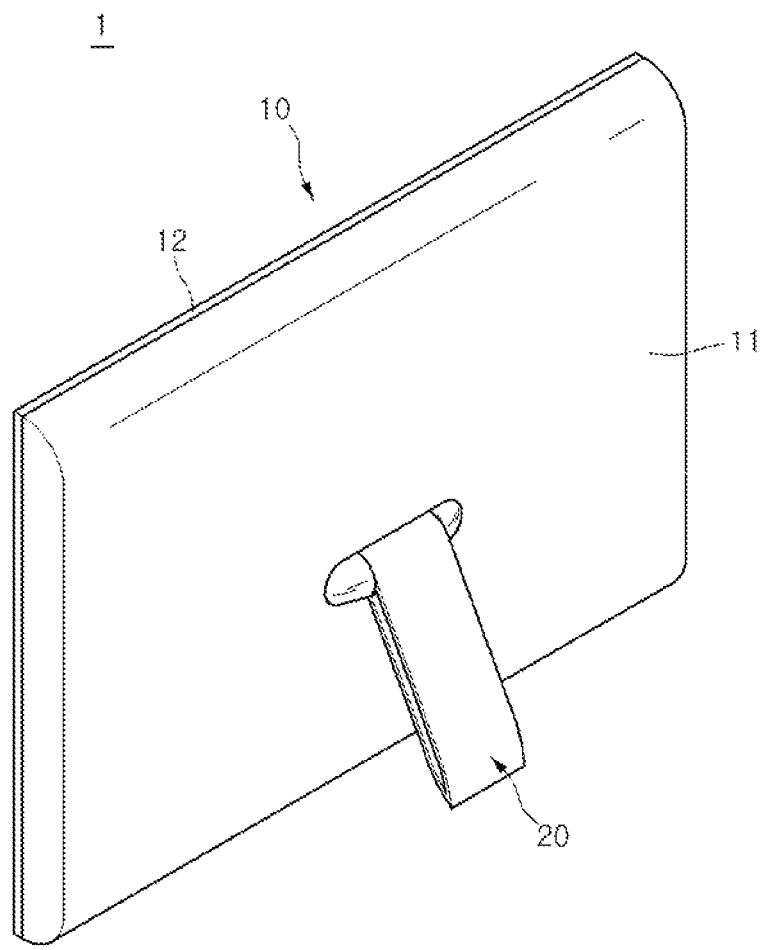
FIG. 1 is a perspective view illustrating the rear part of a display device according to an embodiment.

FIG. 1 is a perspective view illustrating the rear part of a display device according to an embodiment.

Referring to FIG. 1, a display device 1 according to the current embodiment includes: a display main body 10 from which an image is output; and a flip hinge stand 20 coupled to a rear surface of the display main body 10 to support the display main body 10.

The display main body 10 includes: a display module (not shown) on which an image is displayed; a front cabinet 12 constituting a front exterior of the display device 1; and a rear cabinet 11 constituting a rear exterior of the display device 1.

Figure 2:
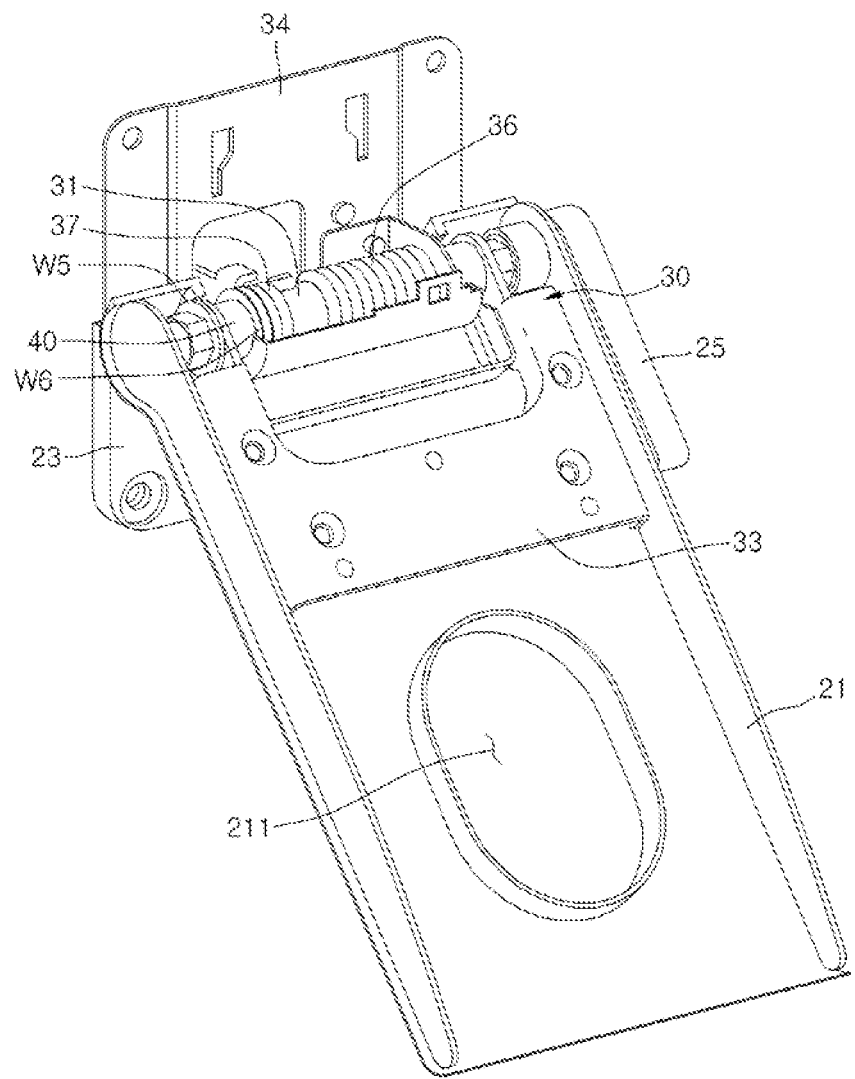
FIG. 2 is a perspective view illustrating an inner part of a stand assembly of FIG. 1.
Figure 3:
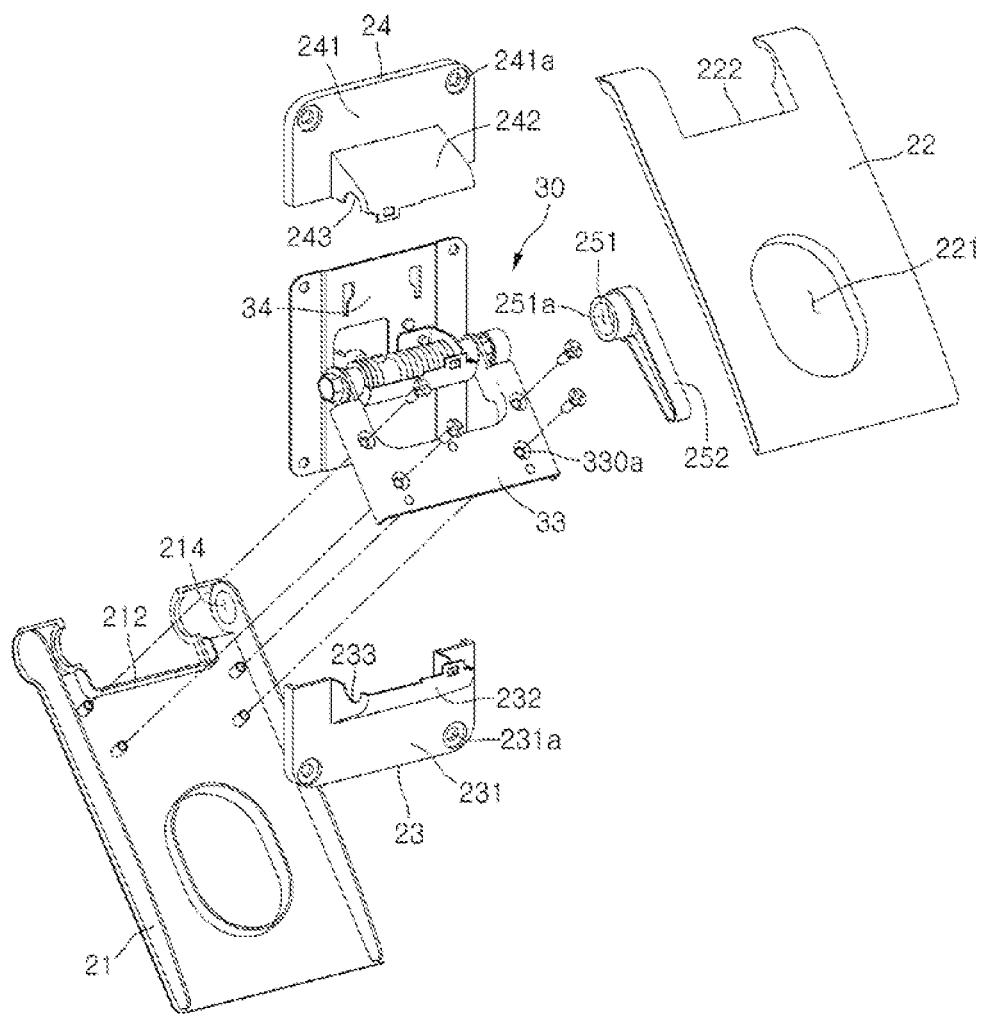
FIG. 3 is an exploded perspective view illustrating the stand assembly of FIG. 2.
Figure 4:
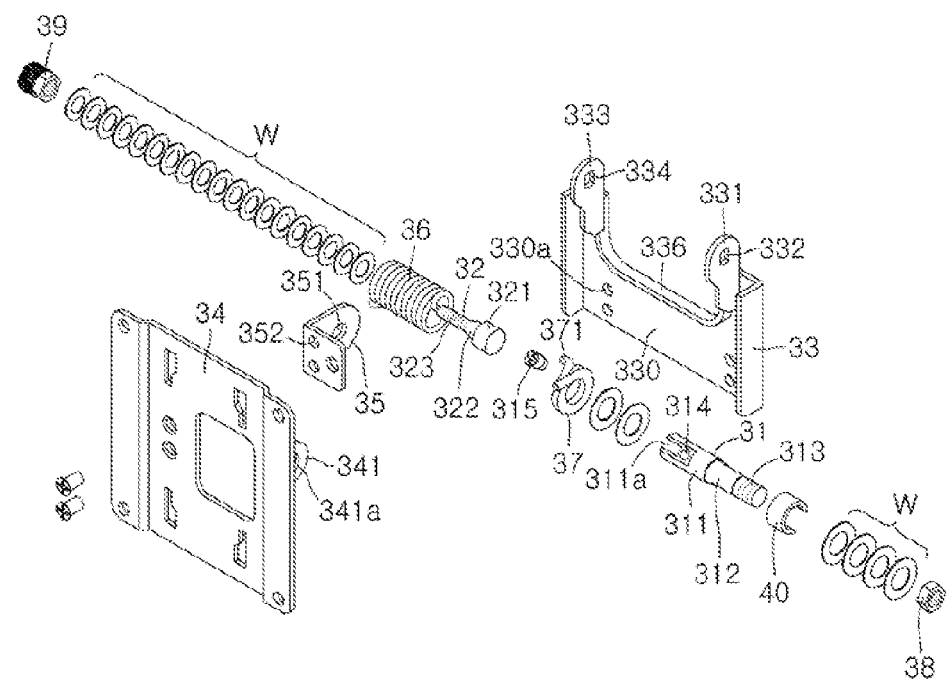
FIG. 4 is an exploded perspective view illustrating a flip hinge assembly of FIG. 3.
Figure 5:
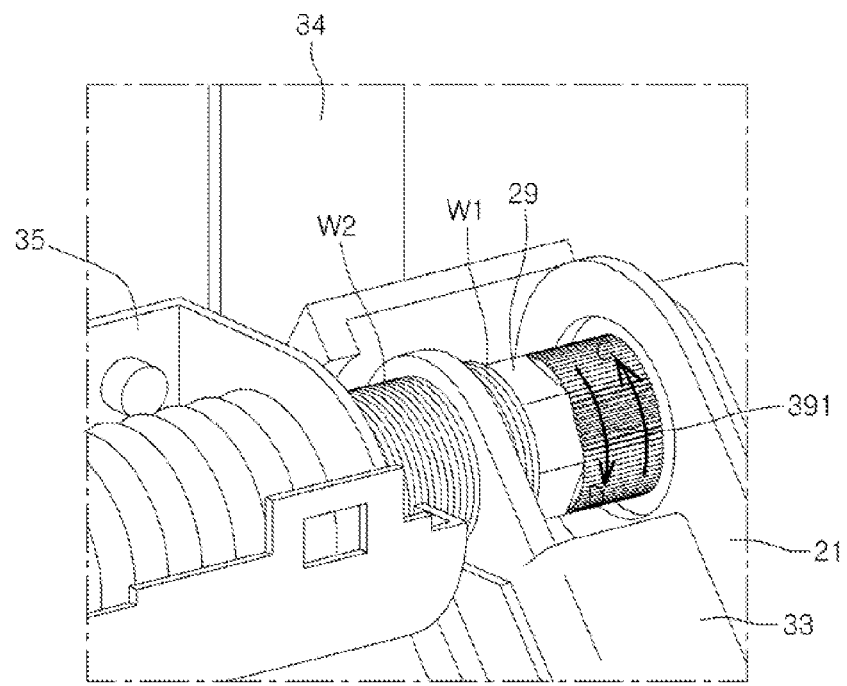
FIG. 5 is a partial enlarged view illustrating a second coupling nut of FIG. 4.

FIG. 2 is a perspective view illustrating an inner part of a flip hinge stand according to the current embodiment. FIG. 3 is an exploded perspective view illustrating a flip hinge stand according to the current embodiment. FIG. 4 is an exploded perspective view illustrating a flip hinge assembly according to the current embodiment. FIG. 5 is a partial enlarged view illustrating a second coupling nut according to the current embodiment.

Referring to FIGS. 2 to 5, the flip hinge stand 20 includes: a stand body 21 extending from the display main body 10; a flip hinge assembly 30 coupled to the stand body 21, and rotating the stand body 21 about the display main body 10; a plurality of hinge shaft housings 23 and 24 preventing the inner part of the flip hinge assembly 30 from being exposed; and a fastening member 25 for adjusting torque of the flip hinge assembly 30.

The stand body 21 and a stand body 22 include a first body 21 and a second body 22, which are coupled to each other with a flip hinge body 33 (to be described later) therebetween. The first body 21 and the second body 22 may be coupled to each other by a hook. The stand bodies 21 and 22 have a space of a certain size therein to accommodate the flip hinge body 33.

The stand bodies 21 and 22 are coupled to the flip hinge body 33 and rotate integrally with the flip hinge body 33. The stand bodies 21 and 22 may be coupled to the flip hinge body 33 by a coupling member.

Holes 211 may pass through the first and second bodies 21 and 22. The hole 211 may decrease the weight of the stand body 21 and improve the appearance thereof.

Recess parts 212 and 222 having a certain depth are disposed in the upper ends of the first and second bodies 21 and 22 to prevent the first and second bodies 21 and 22 from interfering with the hinge shaft housings 23 and 24 and a hinge shaft assembly to be described later.

A fastening member insertion hole 214 is disposed in a side portion of the upper end of the first body 21 to receive the fastening member 25.

The flip hinge assembly 30 includes: a hinge shaft 31 functioning as a rotation shaft when the display main body 10 is tilted; an auxiliary hinge shaft 32 coupled to the hinge shaft 31; the flip hinge body 33 rotating about the hinge shaft 31; a coupling bracket 34 supporting an end of the hinge shaft 31 and coupling to the display main body 10; a supporting bracket 35 coupled to the coupling bracket 34 to support the other end of the hinge shaft 31; and first and second elastic members 36 and 37 providing elastic force to the flip hinge body 33.

The hinge shaft 31 and the auxiliary hinge shaft 32 are coupled to each other to constitute a hinge shaft assembly.

Since the hinge shaft 31 and the auxiliary hinge shaft 32 as two parts constitute the hinge shaft assembly, the hinge shaft 31 and the auxiliary hinge shaft 32 can be more easily coupled to the flip hinge body 33 than an unified hinge shaft assembly is coupled thereto.

The hinge shaft 31 includes: a body part 311; a first non-circular part 312 having a non-circular shape, and inserted in the flip hinge body 33; and a first male screw part 313 disposed at an end of the hinge shaft 31.

When the hinge shaft 31 is coupled to the flip hinge body 33, the body part 311 is disposed in a left and right direction within the flip hinge body 33. The body part 311 may have a cylindrical shape.

An elastic member fixing recess 311a may be disposed in the body part 311, and an end of the first elastic member 36 may be fixed to the elastic member fixing recess 311a. As the hinge shaft 31 rotates, the end of the first elastic member 36 inserted in the elastic member fixing recess 311a is also rotated.

The body part 311 may have a hollow to accommodate a portion of the auxiliary hinge shaft 32.

An insertion hole 314 is disposed in the body part 311 to accommodate a pressing member 315. When the flip hinge body 33 rotates through a predetermined angle or more, the pressing member 315 contacts the second elastic member 37 to deform the second elastic member 37.

The pressing member 315 is inserted in the insertion hole 314, and is protruded a predetermined length from an outer circumferential surface of the hinge shaft 31. For example, the pressing member 315 may be a screw. An operation of the pressing member 315 for deforming the second elastic member 37 will be described later.

The first non-circular part 312 is extended from the body part 311. When the flip hinge body 33 is rotated, the first non-circular part 312 substantially contacts the flip hinge body 33.

Since the first non-circular part 312 has a non-circular shape such as a hexagonal shape, when the flip hinge body 33 is rotated, the first non-circular part 312 is rotated integrally with the hinge shaft 31.

The first male screw part 313 is extended from the first non-circular part 312 and has a screw thread to be fastened by a first coupling nut 38.

The auxiliary hinge shaft 32 includes: an insertion part 321 inserted in the body part 311; a second non-circular part 322 having a non-circular shape and inserted in the flip hinge body 33; and a second male screw part 323 extended from the insertion part 321.

The insertion part 321 has a shape corresponding to an inner circumferential shape of the body part 311, so that the insertion part 321 can be inserted therein. For example, the insertion part 321 may have a circular shape.

When the flip hinge body 33 is rotated, the second non-circular part 22 substantially contacts the flip hinge body 33.

Since the second non-circular part 322 has a non-circular shape such as a hexagonal shape, when the flip hinge body 33 is rotated, the second non-circular part 322 is rotated integrally with the auxiliary hinge shaft 32.

The second male screw part 323 is extended from the second non-circular part 322 and has a screw thread to be fastened by a second coupling nut 39.

The flip hinge body 33 includes: a body part 330 coupled to the stand body 21; a first insertion bracket 331 disposed on a side portion of the upper end of the body part 330; and a second insertion bracket 333 disposed on another side portion of the upper end of the body part 330.

Through holes 330a may be disposed in the body part 330. Coupling members pass through the through holes 330a to couple the body part 330 to the first body 21.

A recess part 336 may be recessed a predetermined depth in the upper end of the body part 330. When the flip hinge body 33 is rotated, the recess part 336 prevents the flip hinge body 33 from interfering with the hinge shaft housing 23.

The first insertion bracket 331 has a first insertion hole 332 in which the hinge shaft 31 is inserted. The second insertion bracket 333 has a second insertion hole 334 in which the auxiliary hinge shaft 32 is inserted.

The first insertion hole 332 has a non-circular shape corresponding to the first non-circular part 312. The second insertion hole 334 has a non-circular shape corresponding to the second non-circular part 322.

Thus, when the flip hinge body 33 is rotated, the hinge shaft 31 and the auxiliary hinge shaft 32 are rotated together with the flip hinge body 33, as described above.

The first coupling nut 38 is coupled to an end of the hinge shaft 31 to couple the hinge shaft 31 to the flip hinge body 33. A female screw is disposed in the first coupling nut 38 to be screwed to the first male screw part 313. The first coupling nut 38 prevents the hinge shaft 31 from being removed from the flip hinge body 33.

The second coupling nut 39 is coupled to an end of the auxiliary hinge shaft 32 to couple the auxiliary hinge shaft 32 to the flip hinge body 33. A female screw is disposed in the second coupling nut 39 to be screwed to the second male screw part 323. A fastening male screw part 391 is disposed on an outer portion of the second coupling nut 39, and is screwed to the fastening member 25.

The hinge shaft assembly is covered with the hinge shaft housings 23 and 24. The hinge shaft housing 23 includes a first hinge shaft housing 23 covering the lower part of the hinge shaft assembly, and a second hinge shaft housing 24 covering the upper part of the hinge shaft assembly.

Further, the hinge shaft housings 23 and 24 include: coupling parts 231 and 241 for coupling to the display main body 10; and cover parts 232 and 242 extending rearward from the coupling parts 231 and 241, and covering the hinge shaft assembly.

Coupling holes 231a and 241a through which coupling members pass are disposed in the coupling parts 231 and 241. The coupling members, sequentially passed through the coupling holes 231a and 241a and the coupling bracket 34, are inserted in the display main body 10. That is, the hinge shaft housings 23 and 24 are coupled to the display main body 10 with the coupling bracket 34 therebetween.

The flip hinge assembly 30 includes a plurality of washers W. The washers W have a circular disk shape with a hole through which the hinge shaft 31 or the auxiliary hinge shaft 32 passes.

Particularly, the washers W may include: a first washer W1 inserted between the flip hinge body 33 and the second coupling nut 39; a second washer W2 inserted between the flip hinge body 33 and the supporting bracket 35; a third washer W3 inserted between the first elastic member 36 and the supporting bracket 35; a fourth washer W4 inserted between the second elastic member 37 and a hinge shaft support part 341 to be described later; and a fifth washer W5 inserted between the flip hinge body 33 and the first coupling nut 38.

The washers W are disposed between components of the flip hinge assembly 30 to facilitate rotation of the components and protect the components from damage.

The fastening member 25 is coupled to the second coupling nut 39. Particularly, the fastening member 25 includes a fastening part 251 for rotating the second coupling nut 39, and an extension part 252 extending from the fastening part 251.

The fastening part 251 has an insertion hole 251a in which the second coupling nut 39 can be inserted. A female screw part (not shown) that can be screwed to the fastening male screw part 391 is disposed in an inner circumferential surface of the insertion hole 251a.

A user applies force substantially to the extension part 252 to rotate the fastening part 251.

The fastening member 25 may be rotated in a direction in which a user fastens the second coupling nut 39, that is, in a direction C of FIG. 5, whereby the second coupling nut 39 presses the first washer W1. That is, the first washer W1 and the second washer W2 press the second insertion bracket 333 of the flip hinge body 33 from both sides thereof.

Thus, when the second coupling nut 39 is fastened using the fastening member 25, frictional force between the flip hinge body 33 and the first washer W1 and frictional force between the flip hinge body 33 and the second washer W2 are increased, In this case, force for rotating the flip hinge body 33 should be greater than force required before the second coupling nut 39 is fastened using the fastening member 25. That is, it is difficult to change an angle between the flip hinge body 33 and the display main body 10.

On the contrary, the fastening member 25 may be rotated in a direction in which a user unfastens the second coupling nut 39, that is, in a direction D of FIG. 5, whereby the second coupling nut 39 releases the first washer W1.

Thus, when the second coupling nut 39 is unfastened using the fastening member 25, the frictional force between the flip hinge body 33 and the first washer W1 and the frictional force between the flip hinge body 33 and the second washer W2 are decreased. Accordingly, the flip hinge body 33 can be rotated about the display main body 10 with small force. That is, it is easy to change an angle between the flip hinge body 33 and the display main body 10.

The coupling bracket 34 is coupled to the rear surface of the display main body 10. The hinge shaft support part 341 for supporting a portion of the hinge shaft 31 may be formed by bending a portion of the coupling bracket 34.

The hinge shaft support part 341 has a through hole 341a through which the hinge shaft 31 passes. The hinge shaft support part 341 may be provided with a second elastic member fixing part 341b (refer to FIG. 7) to which the second elastic member 37 to be described later is fixed.

A connecting ring 40 may be inserted between the hinge shaft support part 341 and the first insertion bracket 331 of the flip hinge body 33. Washers W6 may be fitted on both side portions of the connecting ring 40 to facilitate rotation of the connecting ring 40.

The supporting bracket 35 is coupled to the coupling bracket 34 to support a side portion of the hinge shaft 31. The supporting bracket 35 may be bent at a predetermined angle.

The supporting bracket 35 has: a through hole 351 through which the hinge shaft 31 passes through; a plurality of coupling holes 352 through which coupling members for coupling the supporting bracket 35 and the coupling bracket 34 pass; an elastic member fixing recess 353 (refer to FIG. 6) in which an end of the first elastic member 36 is inserted.

The supporting bracket 35 may be formed separately from the coupling bracket 34 according to the current embodiment, or be integrally formed therewith. For example, the supporting bracket 35 may be formed by bending a portion of the coupling bracket 34, like the hinge shaft support part 341.

Since the supporting bracket 35 is formed separately from the coupling bracket 34 according to the current embodiment, the width of the flip hinge body 33 is allowed to be varied.

Rotatable parts, such as the hinge shaft 31, the auxiliary hinge shaft 32, the pressing member 315, and the flip hinge body 33, may be referred to as rotary parts, and parts fixed without rotation to the display main body 10, such as the coupling bracket 34 and the supporting bracket 35, may be referred to as stationary parts.

Figure 6:
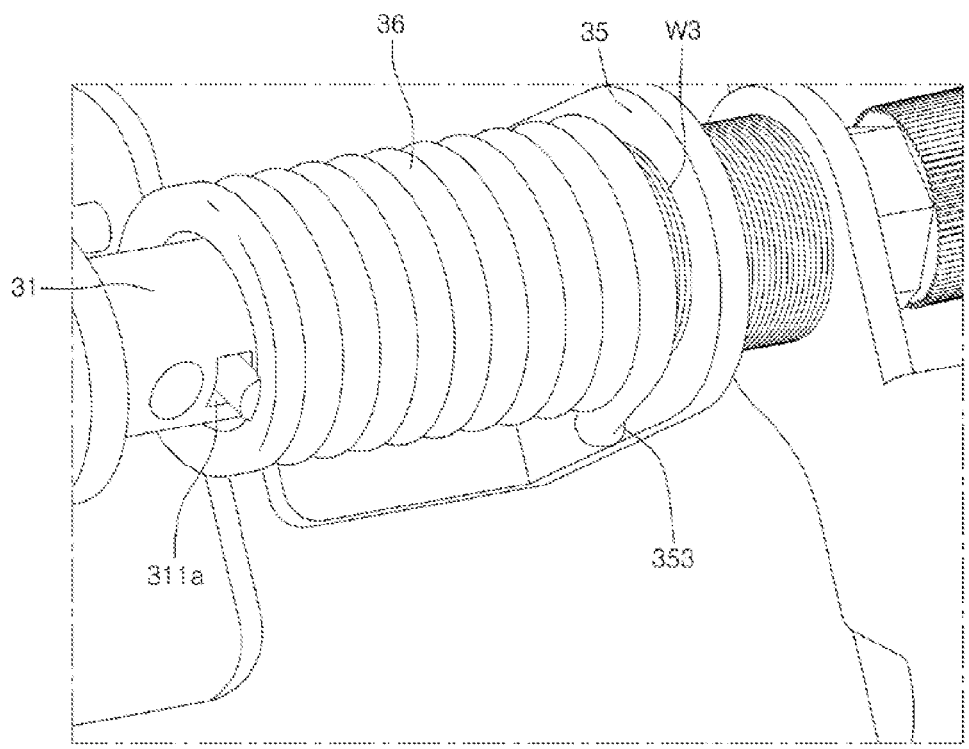
FIG. 6 is a partial enlarged view illustrating an installation state of a first elastic member of FIG. 4.
Figure 7:
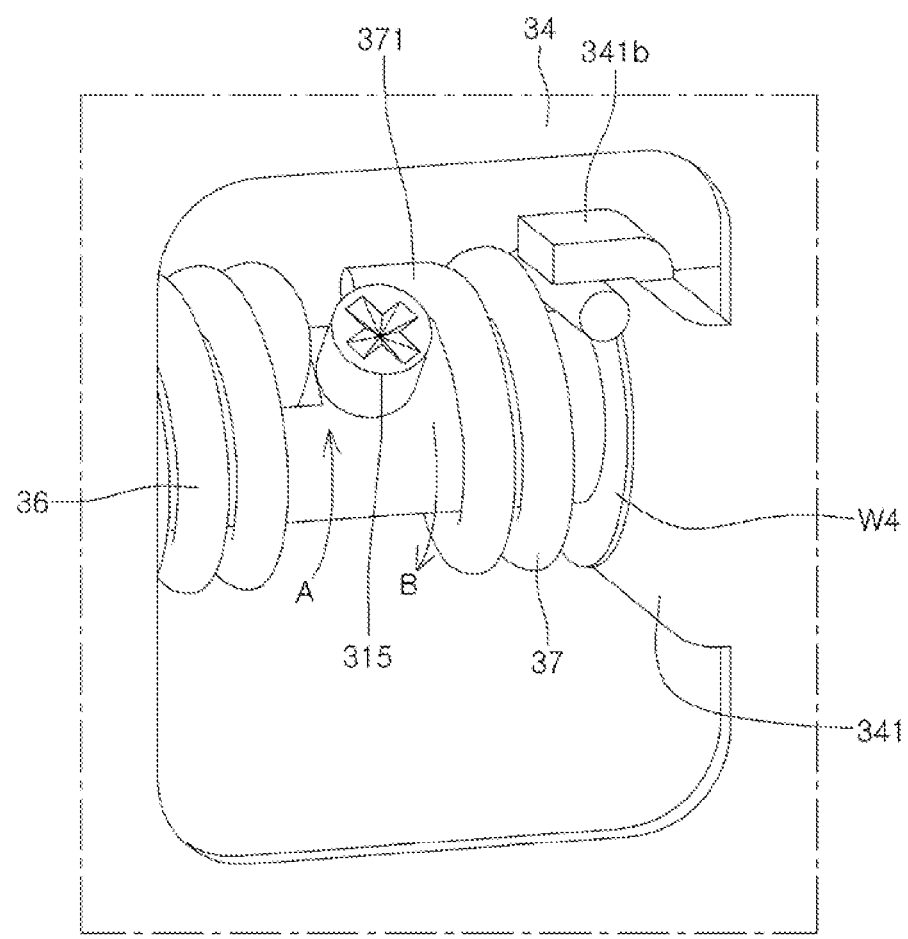
FIG. 7 is a partial enlarged view illustrating an installation state of a second elastic member of FIG. 4.

FIG. 6 is a partial enlarged view illustrating a first elastic member installed according to the current embodiment. FIG. 7 is a partial enlarged view illustrating a second elastic member installed according to the current embodiment.

Referring to FIGS. 4 to 7, the first elastic member is coupled to the supporting bracket 35 and the hinge shaft 31. Particularly, an end of the first elastic member 36 is fixed to the elastic member fixing recess 353 of the supporting bracket 35, and the other end thereof is fixed to the elastic member fixing recess 311a of the hinge shaft 31. The first elastic member 36 may be a torsion spring.

When the flip hinge body 33 rotates, the hinge shaft 31 also rotates. Thus, an end of the first elastic member 36 is fixed to the supporting bracket 35, and the other end thereof is rotated together with the hinge shaft 31. Accordingly, the first elastic member 36 is twisted to thereby apply elastic force to the hinge shaft 31.

Thus, the first elastic member 36 returns the flip hinge body 33 to the original position thereof after the rotation.

The second elastic member 37 may selectively contact the pressing member 315, an end of which is fixed to the coupling bracket 34, and the other end thereof is fixed to the hinge shaft 31. The second elastic member 37 may be a torsion spring, like the first elastic member 36.

In detail, an end of the second elastic member 37 is fixed by the second elastic member fixing part 341b of the hinge shaft support part 341. The second elastic member fixing part 341b is formed by bending a portion of the hinge shaft support part 341.

The end of the second elastic member 37 may be fitted and fixed between the second elastic member fixing part 341b and the hinge shaft 31.

The other end of the second elastic member 37 may be bent at a predetermined angle. For example, a line extended from the second end of the second elastic member 37 may be perpendicular to a line extended from the first end of the second elastic member 37. The second end of the second elastic member 37, bent at a predetermined angle, selectively catches the pressing member 315, and thus, may be referred to as a catching part 371.

When the flip hinge body 33 is rotated through a predetermined angle or greater by the first elastic member 36, the second end of the second elastic member 37 contacts the pressing member 315. Then, the second end of the second elastic member 37, that is, the catching part 371 catches the pressing member 315, to thereby prevent further rotation of the flip hinge body 33.

The second elastic member 37 applies elastic force to the pressing member 315 in a direction (a direction B of FIG. 7) opposite to a direction (a direction A of FIG. 7) of elastic force of the first elastic member 36, so as to stop rotation of the flip hinge body 33 at a point where the elastic force of the first elastic member 36 and the elastic force of the second elastic member 37 are in equilibrium.

Winding numbers, thicknesses, and materials of the first and second elastic members 36 and 37 may be adjusted such that when a front surface of the display main body 10 forms about 10 degrees with an imaginary vertical line, elastic force of the first elastic member 36 and the elastic force of the second elastic member 37 are in equilibrium.

For example, the winding number of the second elastic member 37 may be smaller than the winding number of the first elastic member 36.

In this case, when the front surface of the display main body 10 forms about 10 degrees with the imaginary vertical line, the catching part 371 of the second elastic member 37 contacts the pressing member 315.

At this point, force the second elastic member 37 applies to the pressing member 315 is greater than force by which the first elastic member 36 rotates the flip hinge body 33, thereby preventing the first elastic member 36 from further rotating the flip hinge body 33.

Hereinafter, an operation of a display device according to the current embodiment will now be described.

Figure 8:
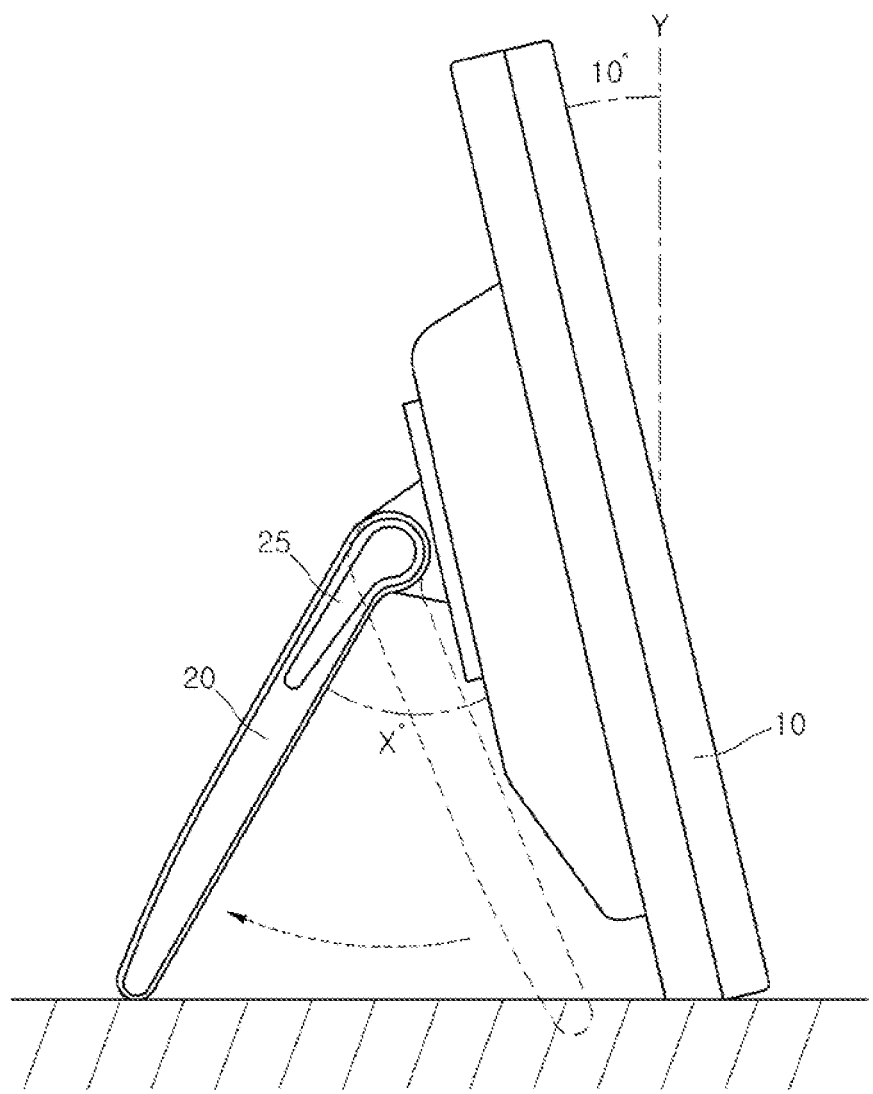
FIG. 8 is a side view illustrating a state that the display device of FIG. 1, to which no external force is applied, is placed on a supporting surface.
Figure 9:
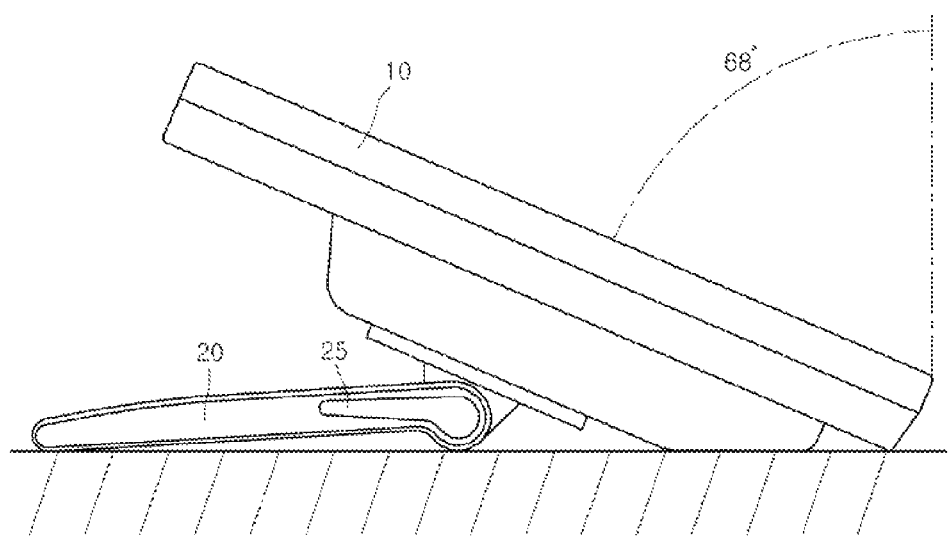
FIG. 9 is a side view illustrating a state that the display device of FIG. 1 is maximally inclined rearward.

FIG. 8 is a side view illustrating a display device placed on a supporting surface, to which no external force is applied, according to the current embodiment. FIG. 9 is a side view illustrating a display device maximally inclined rearward according to the current embodiment.

Referring to FIGS. 2, 8, and 9, when the display device 1 is stored in a box, the flip hinge stand 20 tightly contacts the display main body 10. To this end, certain force is applied to the flip hinge stand 20. Thus, the number of display devices 1 stored in a limited space such as a box can be maximized.

When the flip hinge stand 20 tightly contacts the display main body 10, the pressing member 315 deforms the second elastic member 37.

When the display device 1 is taken out from a box, force that brings the flip hinge stand 20 in tight contact with the display main body 10 is removed, the hinge shaft 31 is rotated by elastic force the second elastic member 37 applies to the pressing member 315.

That is, the second elastic member 37 is restored to the original shape thereof, and the catching part 371 applies force to the pressing member 315 to thereby rotate the hinge shaft 31. Accordingly, the flip hinge body 33 is rotated together with the hinge shaft 31 clockwise on the basis of FIG. 8.

When the second elastic member 37 rotates the flip hinge body 33 clockwise, the first elastic member 36 is deformed to apply force to the hinge shaft 31 such that the hinge shaft 31 is rotated counterclockwise on the basis of FIG. 8.

That is, when the flip hinge body 33 is rotated, the first and second elastic members 36 and 37 apply force to the hinge shaft 31 in opposite directions.

The rotation of the flip hinge body 33 is stopped at a point when elastic force of the first elastic member 36 and elastic force of the second elastic member 37 are in equilibrium.

When the flip hinge stand 20 forms X degrees with the display main body 10, that is, when an imaginary vertical line Y forms about 10 degrees with the front surface of the display main body 10, elastic force of the first elastic member 36 and elastic force of the second elastic member 37 are in equilibrium.

Thus, when an angle formed between the flip hinge stand 20 and the display main body 10 ranges from about 0 degrees to X degrees, that is, when an angle formed between the imaginary vertical line Y and the front surface of the display main body 10 ranges from about 0 degrees to about 10 degrees, the second elastic member 37 contacts the pressing member 315.

When the angle formed between the imaginary vertical line Y and the front surface of the display main body 10 exceeds about 10 degrees, the second elastic member 37 is restored to the original shape thereof, so as to space the catching part 371 away from the pressing member 315.

In this case, only elastic force of the first elastic member 36 is applied to the hinge shaft 31.

When the display main body 10 is supported by a supporting surface and the flip hinge stand 20, external force may be applied to the display main body 10 to be tilted rearward. At this point, the flip hinge stand 20 is rotated, and the display main body 10 is inclined rearward. For example, the display main body 10 may be tilted rearward until the front surface of the display main body 10 forms about 68 degrees with the imaginary vertical line (Y).

At this point, the first elastic member 36 is deformed to apply elastic force to the hinge shaft 31 in a direction to rotate the flip hinge stand 20 to the original position thereof. Thus, when the external force is removed, the flip hinge stand 20 is returned to the original position thereof.

The angle between the display main body 10 and the imaginary vertical line Y may be maintained to be greater than about 10 degrees. To this end, the display main body 10 may be tilted to a desired angle, and the second coupling nut 39 may be tightly fastened using the fastening member 25, thereby fixing inclination angles of the flip hinge body 33 and the stand body 30.

The display main body 10 may be easily tilted using small external force. To this end, the second coupling nut 39 may be unfastened using the fastening member 25, thereby decreasing frictional force applied to the flip hinge body 33.

According to the embodiment, initial tilting of the display main body 10 is automatically set.

A user can adjust frictional force applied to the flip hinge body 33, by using the fastening member 25, thus adjusting force needed for tilting the display main body 10.

Although the hinge shaft 31 is supported by the coupling bracket 34 and the supporting bracket 35 in the current embodiment, the hinge shaft 31 may be installed on the display main body 10.

The ends of the first elastic member 36 and the second elastic member 37 are fixed to the coupling bracket 34 and the supporting bracket 35. However, the technical sprit of the present invention is not limited thereto, provided that two elastic members which apply elastic force in opposite directions are disposed on the hinge shaft 31. Thus, the ends of the first elastic member 36 and the second elastic member 37 may be fixed to the display main body 10.

The invention claimed is:

1. A display device comprising:
 a display main body from which an image is output; and
 a flip hinge assembly coupled to the display main body,
 wherein the flip hinge assembly comprises:
 a stationary part fixed to the display main body;
 a rotary part rotatably coupled to the stationary part;
 a first elastic member coupled to the rotary part and the stationary part; and a second elastic member, an end of which is coupled to the stationary part, and the other end thereof selectively contacts the rotary part, wherein the second elastic member applies elastic force to the rotary part in a direction opposite to a direction of elastic force the first elastic member applies to the rotary part.

2. The display device according to claim 1, wherein the rotary part comprises: a hinge shaft functioning as a rotation shaft when the display main body is tilted; and a flip hinge body rotating with the hinge shaft.

3. The display device according to claim 2, wherein the stationary part comprises: a coupling bracket coupled to a rear surface of the display main body, and supporting a side portion of the hinge shaft; and a supporting bracket coupled to the coupling bracket, and supporting another side portion of the hinge shaft.

4. The display device according to claim 3, wherein an end of the first elastic member is coupled to the supporting bracket, and the other end thereof is coupled to the hinge shaft.

5. The display device according to claim 2, wherein the hinge shaft comprises a non-circular part having a non-circular cross section, the flip hinge body has an insertion hole in which the hinge shaft is inserted, and the insertion hole has a shape corresponding to the non-circular part.

6. The display device according to claim 2, further comprising a pressing member that is coupled to the hinge shaft and selectively contacts the second elastic member.

7. The display device according to claim 6, wherein the second elastic member is bent such that the first end thereof is coupled to the coupling bracket, and the second end thereof selectively contacts the pressing member.

8. The display device according to claim 2, wherein when an angle formed between the flip hinge body and the display main body is within a preset angle range, the second elastic member contacts the rotary part.

9. The display device according to claim 2, wherein a coupling nut for coupling the flip hinge body to the hinge shaft is coupled to an end of the hinge shaft, and a fastening member is coupled to the coupling nut to fasten the coupling nut.

10. The display device according to claim 9, wherein a fastening male screw part is disposed on an outer portion of the coupling nut, and a female screw part that is screwed to the fastening male screw part is disposed on an inner portion of the fastening member.

11. The display device according to claim 1, wherein the first elastic member and the second elastic member are torsion springs.

12. A display device comprising: a display main body from which an image is output; a hinge shaft coupled to a rear surface of the display main body; a flip hinge body coupled to the hinge shaft and rotating with the hinge shaft; a first elastic member, an end of which is coupled to the display main body, and the other end thereof is coupled to the hinge shaft to pull the hinge shaft in a direction; a second elastic member having an end coupled to the display main body, wherein when an angle formed between the flip hinge body and the display main body is within a preset angle range, the other end of the second elastic member applies elastic force to the hinge shaft or the flip hinge body to rotate the hinge shaft in another direction.

13. The display device according to claim 12, wherein the first elastic member and the second elastic member are torsion springs.

14. The display device according to claim 12, further comprising a pressing member that is coupled to the hinge shaft and selectively contacts the second elastic member.

15. The display device according to claim 14, wherein the pressing member protrudes a predetermined length from an outer circumferential surface of the hinge shaft.

16. The display device according to claim 14, wherein an end part of the second elastic member is bent at a predetermined angle to form a catching part, wherein when the flip hinge body is rotated through a predetermined angle or greater by the first elastic member, the catching part contacts the pressing member.

17. The display device according to claim 12, wherein a stand having a space accommodating the hinge shaft and the flip hinge body is coupled to the rear surface of the display main body.

18. The display device according to claim 17, wherein a coupling nut for coupling the flip hinge body to the hinge shaft is coupled to an end of the hinge shaft, and a fastening member is coupled to the coupling nut to fasten the coupling nut.

19. The display device according to claim 17, wherein the fastening member is inserted into the stand from an outside of the stand and is connected to the coupling nut.

20. The display device according to claim 17, wherein the stand comprises a first body and a second body, which are coupled to each other, and the flip hinge body is disposed between the first and second bodies.

* * * * *